United States Patent
Hendrickson et al.

(10) Patent No.: US 11,292,180 B2
(45) Date of Patent: Apr. 5, 2022

(54) MODULAR INTERLOCKING CONTAINERS WITH ENHANCED LATERAL CONNECTIVITY FEATURES

(71) Applicant: Friendship Products LLC, Arlington, VA (US)

(72) Inventors: B. Everett Hendrickson, Los Angeles, CA (US); Timothy J Carlson, Arlington, VA (US); A. Irene Hendrickson, Los Angeles, CA (US); Craig Severn, Sharon (CA); Ottmar Brandau, Wasaga Beach (CA); Michael Frederick, Santa Monica, CA (US)

(73) Assignee: Friendship Products LLC, Arlington, VA (US)

( * ) Notice: Subject to any disclaimer, the term of this patent is extended or adjusted under 35 U.S.C. 154(b) by 74 days.

(21) Appl. No.: 16/514,343

(22) Filed: Jul. 17, 2019

(65) Prior Publication Data
US 2019/0344492 A1  Nov. 14, 2019

Related U.S. Application Data

(63) Continuation of application No. 15/098,289, filed on Apr. 13, 2016, now Pat. No. 10,414,084, which is a
(Continued)

(51) Int. Cl.
*B29C 49/06* (2006.01)
*B65D 21/02* (2006.01)

(52) U.S. Cl.
CPC .......... *B29C 49/06* (2013.01); *B65D 21/0204* (2013.01); *B65D 21/0231* (2013.01)

(58) Field of Classification Search
None
See application file for complete search history.

(56) References Cited

U.S. PATENT DOCUMENTS

| 2,488,611 A | 7/1945 | Stallings |
| 2,753,077 A | 10/1952 | Greco |

(Continued)

FOREIGN PATENT DOCUMENTS

| EP | 0231141 A2 | 8/1987 |
| JP | 61197220 A | 9/1986 |

(Continued)

OTHER PUBLICATIONS

Japanese Patent Office, Office Action with English Translation, Japanese Divisional Patent Application 2018-224451, dated Sep. 10, 2020.
(Continued)

*Primary Examiner* — Monica A Huson
(74) *Attorney, Agent, or Firm* — Rooney IP, LLC

(57) ABSTRACT

Described are devices and containers that are scalable, modular, and lockable laterally and vertically with other like containers for a variety of applications. A container is formed by a wall attached at first end to a top end section with an opening and attached at a second end by a bottom end section. A container may have one or more of a tongue, formed on the wall, having and interconnecting mechanism to be received and interlocked by a groove. Vertical interconnectivity is accomplished with mechanisms to stack containers and prevent swivel using a ridge and channel interlocking arrangement.

8 Claims, 13 Drawing Sheets

Related U.S. Application Data continuation of application No. 13/251,249, filed on Oct. 1, 2011, now Pat. No. 9,346,585.

(60) Provisional application No. 61/389,191, filed on Oct. 1, 2010.

(56) References Cited

U.S. PATENT DOCUMENTS

| | | |
|---|---|---|
| 2,641,374 A | 10/1953 | Yuen |
| 3,194,426 A | 12/1963 | Brown |
| 3,307,729 A | 1/1964 | Schwartz |
| 3,391,824 A | 6/1964 | Wiseman |
| 3,369,658 A | 5/1966 | Hasselmann |
| 3,815,281 A | 6/1974 | Kander |
| 3,944,074 A | 6/1976 | Riley |
| 3,994,408 A | 11/1976 | Belitzky |
| 4,003,491 A | 1/1977 | Wells et al. |
| 4,258,847 A | 5/1981 | Nierman |
| 4,308,955 A | 1/1982 | Schieser |
| 4,363,415 A | 12/1982 | Rainville |
| 4,515,842 A | 5/1985 | Kovacs |
| 4,521,178 A | 6/1985 | Anger |
| 4,624,383 A | 11/1986 | Moore |
| 4,685,565 A | 8/1987 | Sparling |
| 4,685,656 A | 8/1987 | Lee et al. |
| 4,889,254 A | 12/1989 | Vola |
| 4,966,298 A | 10/1990 | Von Holdt |
| 5,002,199 A | 5/1991 | Frahm |
| 5,050,755 A | 9/1991 | Strawder |
| 5,124,110 A * | 6/1992 | Yokobayashi ......... B29C 49/12 264/520 |
| 5,135,823 A | 8/1992 | Eales |
| D341,781 S | 11/1993 | Sanyal |
| 5,271,515 A | 12/1993 | Berkheimer et al. |
| 5,290,506 A | 3/1994 | Yokobayashi |
| 5,310,071 A | 5/1994 | Rivlin et al. |
| 5,316,159 A | 5/1994 | Douglas et al. |
| 5,340,304 A | 8/1994 | Nakamura |
| 5,381,916 A | 1/1995 | Strawder |
| 5,503,288 A | 4/1996 | Conconi |
| 5,638,974 A | 6/1997 | Mann |
| 5,766,536 A | 6/1998 | Felder |
| D407,020 S | 3/1999 | Doty |
| 6,045,746 A | 4/2000 | Komine et al. |
| D437,366 S | 2/2001 | Stemmler |
| D439,156 S | 3/2001 | Hall et al. |
| 6,276,549 B1 | 8/2001 | Fasci et al. |
| D464,887 S | 10/2002 | Sherwell |
| 6,719,161 B1 | 4/2004 | Craig |
| 6,872,354 B1 | 3/2005 | Mol et al. |
| 6,875,396 B1 | 4/2005 | Limanjaya |
| 7,614,515 B2 | 11/2009 | Furusawa et al. |
| 7,887,315 B2 | 2/2011 | Lane |
| 7,939,005 B2 | 5/2011 | Balboni et al. |
| 7,967,162 B2 | 6/2011 | Pallo et al. |
| 8,201,699 B2 | 6/2012 | Zummo et al. |
| 8,226,402 B2 | 7/2012 | Rousseau |
| 8,348,658 B2 * | 1/2013 | Dagorn ............... B29C 49/4823 425/195 |
| 2004/0202746 A1 | 10/2004 | Tsau |
| 2005/0011853 A1 | 1/2005 | Brugger |
| 2005/0205453 A1 | 9/2005 | Gindi et al. |
| 2006/0059838 A1 | 3/2006 | Pimental |
| 2006/0096942 A1 | 5/2006 | Lane |
| 2006/0261063 A1 | 11/2006 | Dyehouse |
| 2007/0098935 A1 | 5/2007 | Farran et al. |
| 2007/0114200 A1 | 5/2007 | Lane |
| 2008/0283523 A1 | 11/2008 | Alonzo |
| 2009/0045157 A1 | 2/2009 | Panchal |
| 2009/0090647 A1 | 4/2009 | Panchal |
| 2009/0255893 A1 | 10/2009 | Zummo |
| 2009/0266782 A1 | 10/2009 | Lane |
| 2010/0203186 A1 | 8/2010 | Tsau |

FOREIGN PATENT DOCUMENTS

| | | |
|---|---|---|
| JP | 062235056 A | 10/1987 |
| JP | 05228986 A | 9/1993 |
| JP | H678745 U | 11/1994 |
| JP | 2003192044 A | 7/2003 |
| JP | 2006248595 A | 9/2006 |
| JP | 2006264042 A | 10/2006 |
| JP | 2013538763 A | 10/2013 |
| JP | 2016522100 A | 7/2016 |
| WO | WO03055756 A1 | 7/2003 |

OTHER PUBLICATIONS

Brazilian Patent Office, Office Action, Brazilian Patent Application BR1120130078480, dated Mar. 4, 2020.

Canadian Patent Office, Notice of Allowance, Canadian Divisional Patent Application 2984228, dated Apr. 16, 2020.

Japanese Patent Office, Office Action, Japanese Divisional Patent Application 2018-224451, dated Sep. 26, 2019.

* cited by examiner

MODULAR INTERLOCKING CONTAINERS WITH ENHANCED LATERAL CONNECTIVITY FEATURES

CROSS REFERENCE TO RELATED APPLICATIONS

This application is a continuation of pending U.S. patent application Ser. No. 15/098,289 filed on Apr. 13, 2016, which claims the benefit of U.S. patent application Ser. No. 13/251,249 filed on Mar. 17, 2014, now U.S. Pat. No. 9,346,585 which issued May 24, 2016, which claims the benefit of U.S. Provisional Patent Application Ser. No. 61/389,191, filed on Oct. 10, 2010, the contents of each of which are hereby incorporated by reference in their entireties.

BACKGROUND

Recently, world events and natural disasters have caused more attention to be given to the intermixing of environmental, economic, and humanitarian needs around the world. For example, the Pacific Ocean tsunami, earthquakes in Haiti and Peru, and Hurricane Katrina all caused immense humanitarian needs and devastating loss of life. First responders to such disasters normally set up tents to house refugees. The assumption is that the stay in the tents will be brief. However, depending on the disaster, the results often show otherwise. Tents are only useful in limited climate conditions. They also wear out over time, forcing residents to piece together sticks, branches, scrap metal or plastic for tent repair. The relatively few plastic containers in disaster relief sites are used mainly for water vessels, even though many are discarded fuel containers.

One example of such a scenario is the Abu Shouk IDP camp in El Fasher, Northern Darfur. There, refugees were placed in tents on a vast scale numbering in the thousands, where they denuded the vegetation during their difficult and lengthy duration of stay. These lengthy stays under conditions of severe deprivation tax the host nation's natural resources and increase the environmental degradation of the host landscapes via stripped vegetation and toxic garbage dumps. These environmental burdens naturally lead to political pressure on the host government to insist on shorter stays. In war torn areas, shifts in zones of control may force camp dwellers to flee approaching combatants, even in the absence of "official" pressure.

Other environmental and economic issues develop more slowly, such as the issue of widespread and burgeoning use of plastic beverage bottles and the enormous amount of waste caused by their disposal. One estimate states that Americans consume 2.5 million plastic bottles every five minutes or about 263 billion bottles each year. Approximately one-quarter of all plastic bottles are made with PET plastic for drinking water or soft beverages.

Although some consumers recycle, mountains of bottles still go to waste. Over the past decade recycling rates in America have decreased from over 30% to just over 20%, meaning close to 80% of plastic bottles end up in the waste stream. Approximately 50 billion PET bottles alone are wasted each year. Much of that waste ends up in landfills, but a significant amount ends up in roadside dumps or, even worse, in rivers and oceans. The "Pacific Trash Vortex," is also known as the "Great Pacific Garbage Patch." It is steered by prevailing currents to a still zone north of Hawaii. The Vortex has four to six million tons of a soup-like garbage mix that hovers just under the surface in an area the size of Texas or France. It is estimated that 80% of the Vortex is from plastic, with a large portion being PET plastic bottles.

Due to expanding populations increasing the demand for drinking water, food, and consumables, including in disaster zones, the need for plastic bottles will only increase.

There is, then, a compelling need for plastic bottle designs that have secondary uses such that consumers will contemplate a fuller life cycle for the bottles. Such uses could increase recycling rates, or re-use rates, thereby lowering the volume of waste bottles disposed of each year and in the decades ahead.

SUMMARY

The present invention and its embodiments relate to containers that are scalable, modular, and lockable laterally and vertically with other like containers. Various embodiments of such scalable, modular, interlocking containers are provided for a variety of applications. One use of an interlocking container of the present invention is as a vessel for storing and/or transporting flowable materials such as liquids, pourable solids, and other such small granular materials that are relatively easy to empty via pouring. Another use of the interlocking containers is as a sturdy, modular, low cost, easily-assembled building material of a standardized nature. They may also be used as bottles or cans for transporting and drinking water and other liquids. The containers themselves could be recycled as building materials to construct basic structures and shelters such as for international relief and development efforts, and/or structures and shelter for military applications. A further use is attendant to the disassembly of structures (walled and otherwise) built from the containers, such as disassembly for purposes of relocating and/or reconfiguring the units as needs change. Embodiments of reduced sized have other uses, such as for a modeling agent or modeling toy or furniture elements.

All uses also greatly benefit the environment by reducing the waste stream through recycling. The environmental problems created by solid waste in general and plastic containers in particular are well known. The U.S. Environmental Protection Agency reported that from 1980 to 2005, the volume of municipal solid waste increased 60% resulting in 246 million tons being generated in 2005 in the United States. The present technique provides an incentive to re-use containers not only for similar uses (such as to hold materials) but also for other applications (e.g., as building blocks for shelter construction). For example, certain embodiments of containers and bottles containing solid and liquid foodstuffs are recycled into use as construction materials, thereby reducing solid waste. A common alternative is to recycle containers by collecting, sorting and reprocessing the material. Another alternative is to reuse the containers for their original purpose for which they were purchased instead of recycling them. That alternative, however, requires sufficient demand for the containers such that a large number can be re-used.

The embodiments of consumer-sized containers could also increase the potential for recycling into other uses, which could reduce the two million tons of trash in the United States that is generated from throwing away plastic water bottles. Containers made of aluminum or other packaging materials account for another very large portion of the trash stream. The incentive for consumers to "mass" containers after their original use makes it considerably more likely that the containers will be recycled in similar high proportion once their secondary use has terminated, a pattern that promises to improve end-stage recycling rates markedly.

The embodiments of the likely smaller consumer-sized containers or bottles also increase the potential for recycling into other uses, in turn reducing a large portion of solid waste presently generated from discarding plastic water bottles. The embodiments also have humanitarian purposes. Resulting simple-walled structures are easily amenable to local/traditional roofing solutions or to emergency relief roofing techniques and materials. As for yet other important efficiencies, the various embodiments of the exemplary containers allow cost-effective molding by eliminating unnecessary details in the quest for design and functional elegance.

Efficient transportation of bulk quantities of containers for any purpose can be challenging. Typically, efficient packing and transport of containers are helped by avoiding odd shapes and by eliminating or at least significantly reducing damage caused by unnecessary protruding edges. The exemplary containers include such advantages and additionally are scalable to conform to shipping standards, including sizes of pallets and containers.

Perfect or near perfect scalability of containers allows for the manufacture of sizes and volumes regularly used in relevant industries, including prominently in the international delivery of relief and development field, but also for other practical and/or hobbyist uses, including in sizes amenable to hold beverages and other consumer goods. Embodiments include re-usable containers appropriate for use in all geographic regions. Among the benefits is ease of assembly by strength-challenged disaster victims and/or by persons without building experience. No or limited mortar, rebar or any other connective addition is needed, and despite no or limited mortar or reinforcing elements, resulting structures can withstand stress forces such as high winds and earthquakes.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages.

DETAILED DESCRIPTION OF THE EMBODIMENTS

Figure 1:
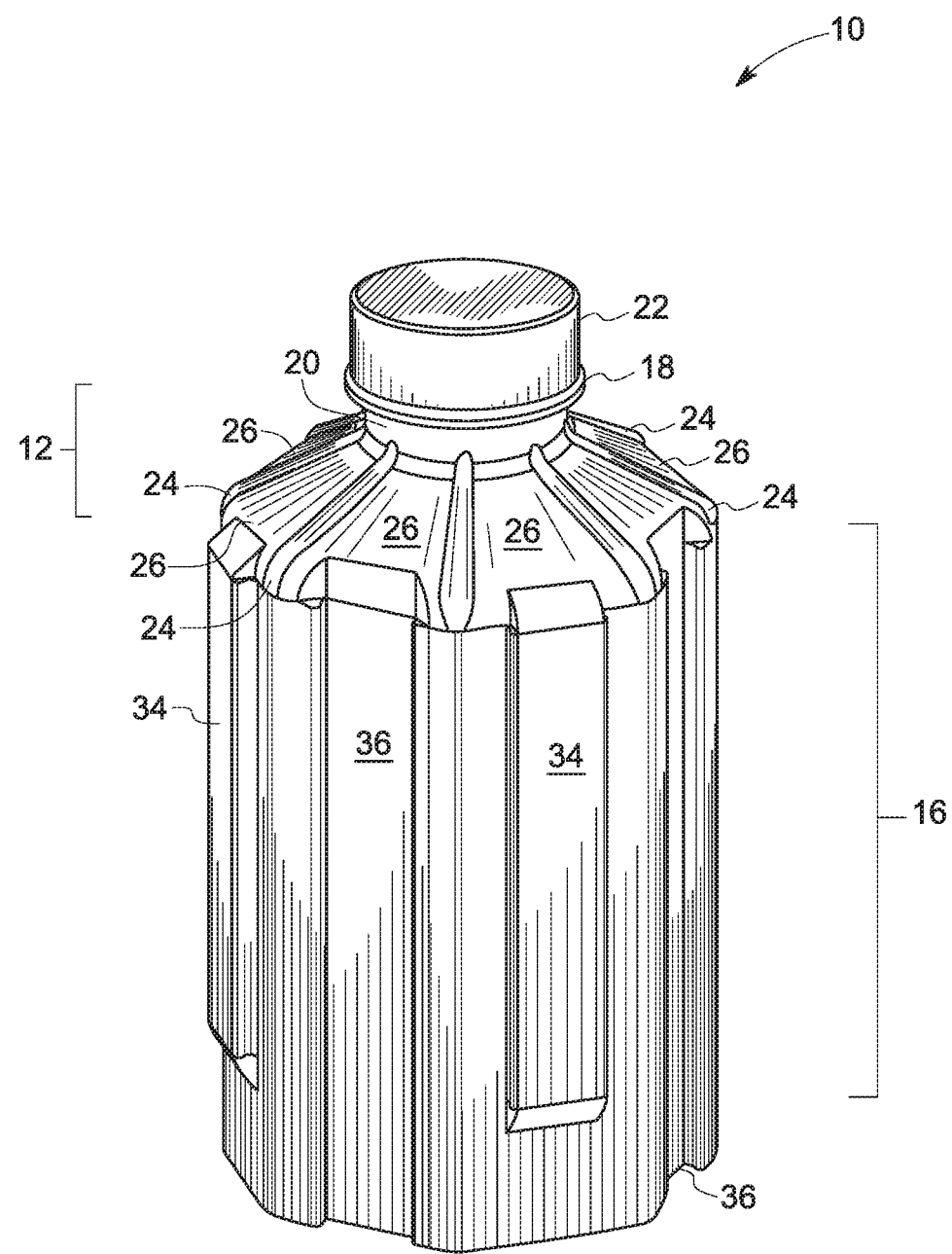
FIG. 1 is an embodiment for an octagonal-shaped modular interlocking container.

Before describing embodiments in detail, it should be noted that the embodiments reside largely in combinations of method steps and apparatus components related to method and system for determining benefits of scalable, modular, interlocking containers with follow-on utility. Accordingly, the apparatus components and method steps have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a nonexclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The embodiments of the invention include a scalable, modular, interconnective, and interlocking container with multi-purpose uses and applications. An exemplary first use is for transporting and/or storing flowable materials such as liquids or pourable solids. An exemplary second use is for a sturdy, low cost, easily assembled building block material of a standardized nature. The embodiments can be used for building housing, storage, or other practical structures, including prominently (but not limited to) applications employed for disaster relief, humanitarian development projects, for military or defense purposes, and for other practical and modeling purposes. The embodiments include a single unit that is interlocked to other modular units of the same or different sizes. Each modular unit slide-locks with other units to form strong wall and building structures that can be filled with liquids such as water, natural earth, sand, or other natural or processed materials, thereby forming a sturdy structure without need of mortar, and can adapt to uneven base surfaces typically found in natural terrain.

Figure 2:
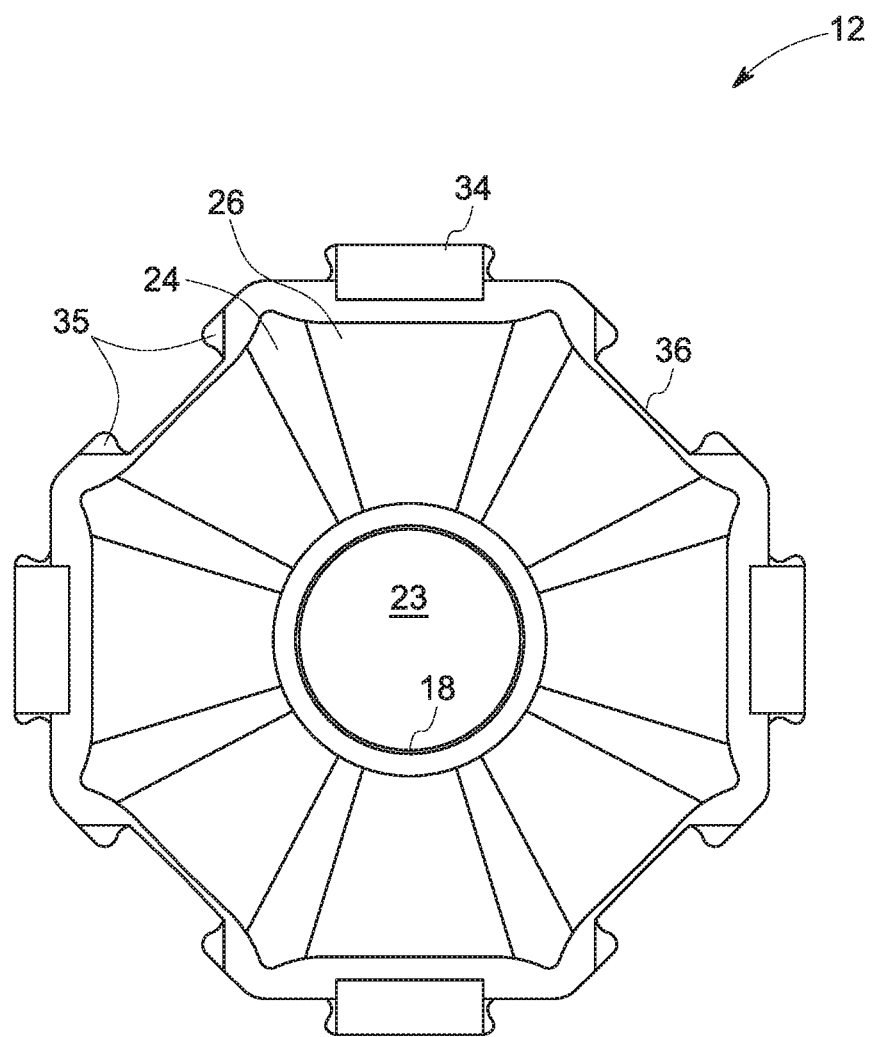
FIG. 2 is plan view of the top portion of the embodiment for the octagonal-shaped interlocking container illustrated in FIG. 1.
Figure 3:
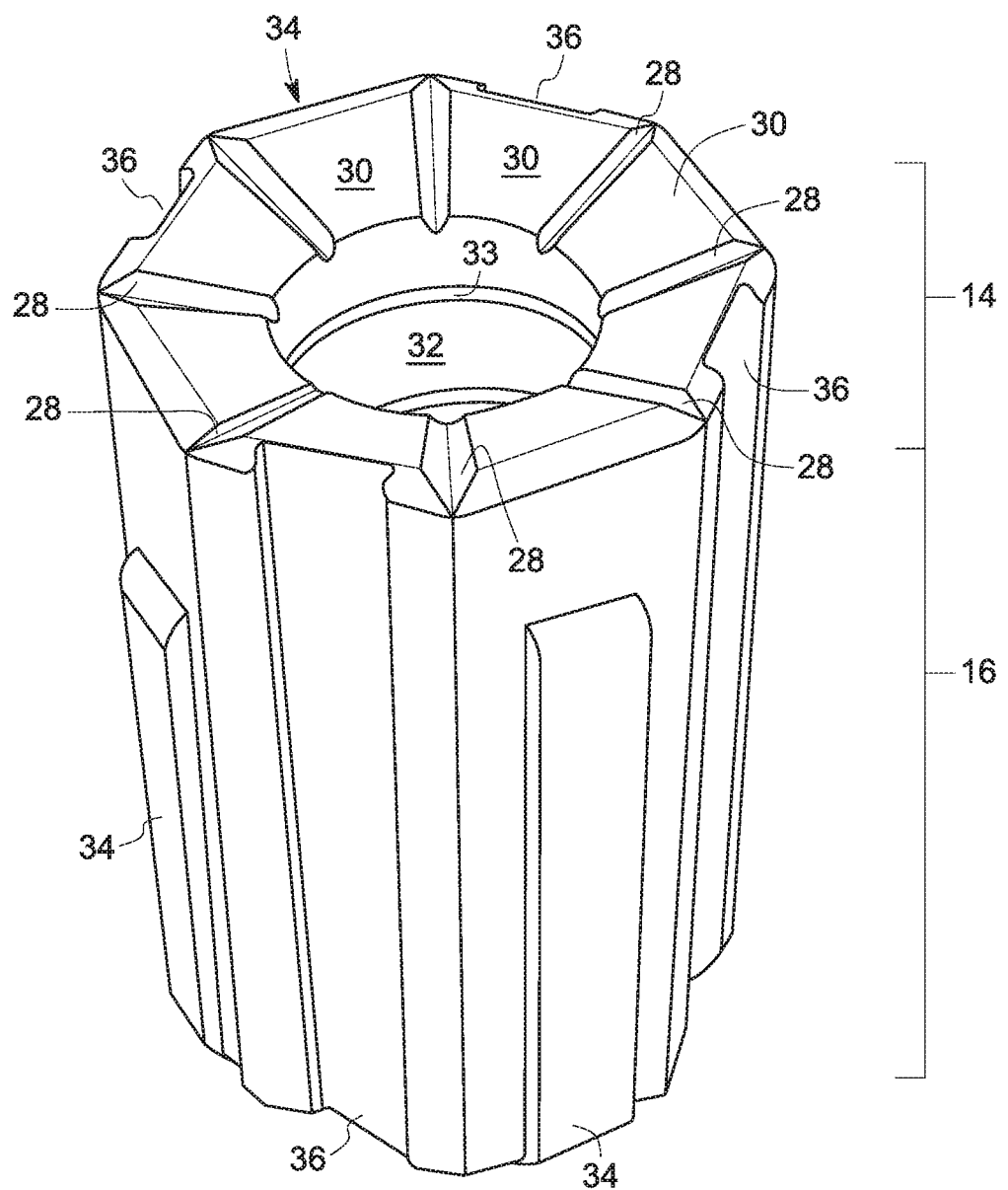
FIG. 3 is a perspective view of the bottom portion of the octagonal-shaped interlocking container illustrated in FIG. 1.
Figure 4:
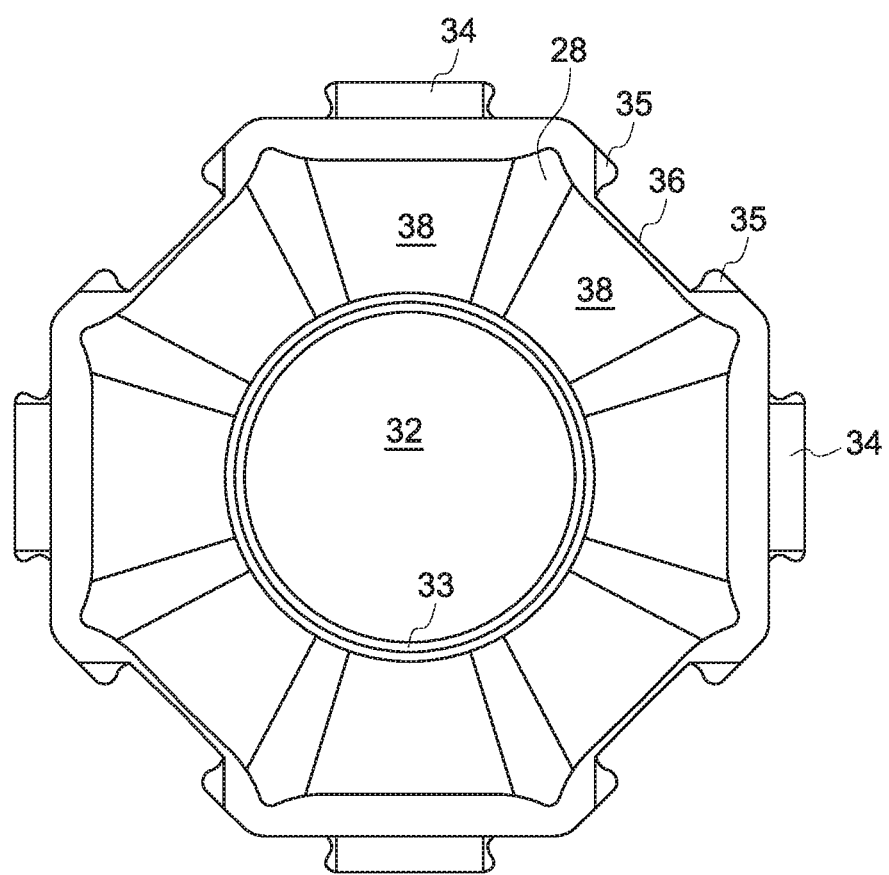
FIG. 4 is a plan view of the bottom portion of the embodiment for the octagonal-shaped interlocking container illustrated in FIG. 1.

Embodiments of a scalable, modular interconnecting container are described in relation to the drawings in the figures. FIG. 1 illustrates a perspective view of upright container 10 and FIG. 2 illustrates a plan view of the top portion of container 10 that is referred to herein as the top end assembly portion or section 12. FIG. 3 shows a perspective view of an inverted container 10, and FIG. 4 illustrates a plan view of the bottom of container 10 that is referred to herein as a bottom end assembly portion or section. Container 10 is a hollow or partially hollow element that may be constructed of plastic, metal, resin, or composites. For example, in certain embodiments, container 10 is made of PET (polyethylene terephthalate, sometimes also referred to as PETE) or other thermoplastic material. As one skilled in the art will recognize, container 10 could be constructed of any rigid material that is appropriately high-strength and could provide sufficient stackable and connectable rigidity. Container 10 may be formed by a wall having any number of upright sides in a geometric cross-sectional pattern or could be formed with a single, cylindrical wall. Container 10 is intended to hold liquids, solids, or gasses but could also be useful as a building element without holding any internal materials.

In the embodiment illustrated in FIG. 1, container 10 is shown with eight longitudinal walls 16 of equal or varying height which form a generally octagonal latitudinal cross-section. The embodiments are not limited, however to an octagonal cross-section and could be formed with circular, triangular, square, rectangular, hexagonal shapes, for example. One skilled in the art will recognize that the shape of the container 10 could be a design construction of any polygon, and could have different heights, diameters or cross-sectional areas, or openings while still forming a container. It should be noted that, in certain embodiments, the design construction is that of a regular polygon.

An exemplary height-to-width ratio of the container 10 is described so as to accommodate certain manufacturing aspects, but also so as to result in a center of gravity of each modular container low enough to impart stability for stacking, shipping, handling, and other such purposes. In certain embodiments, the height-to-width ratio of the container 10 is approximately 3:2. However, the invention is not limited to this ratio, and one skilled in the art will recognize that other embodiments will demonstrate that other ratios are useful and possible.

Top end assembly section 12 provides an opening 23 formed by neck 20 for filling container 10 with any gas, fluid, or solid material. A removable cap 22 is shown over the opening 23 in FIG. 1, which can optionally be manufactured with an airtight or pressure-resistant seal to keep contents within container 10. Cap 22 may connect to neck 20 via threads, snap on, or any type of connection that could form an appropriate seal to hold container contents. With an appropriate seal formed by cap 22, container 10 may be made watertight for holding and transporting liquids (e.g., water, juice, cooking oil), or could form an appropriate seal for granulated or powdered goods (e.g., grains, seeds, flour), household materials (e.g., soap, cleaners), or construction materials (e.g., cement, grout, sand). A transfer ring 18 is formed around neck 20. It should be noted that the transfer ring 18 may also function as a seat for a tamper evident ring (not shown) that may be included between cap 22 and the transfer ring 18 wherever necessary.

Top end assembly 12 is formed with shoulder sections 26 that rise from each top-edge of upright walls 16 and meet neck 20 at the apex of the slope. An advantage of an angled rise in each shoulder section 26 is that it provides for smoother pouring of contents when the container is inverted and assists with complete liquid or granular refilling of container 10, when desired. In the exemplary embodiment, ridges 24 are formed at intersections of each shoulder 26 and extend from neck 20 to a vertex of a wall 16. Ridges 24 may be distributed equidistant from one another or in other configurations formed partially or fully on top end assembly 12 according to user preference or as manufacturing process necessitates. In other embodiments, ridges may be substituted with pegs or knobs on shoulder sections 26. Ridges 24 also provide additional compressive strength and stability for the vertical interlocking of stacked containers, which in turn provides better utility for alignment, packing, transport, construction and modeling purposes. When stacking containers, ridges 24 should fit into corresponding channels formed in the bottom of a container placed vertically on top of container 10. This is explained in more detail in FIGS. 7 to 9 and the corresponding description.

Referring to FIGS. 3 and 4, perspective and plan views are shown of container 10 in an inverted orientation, thus detailing the bottom side of the container. Bottom end assembly section 14 is connected to wall 16 distal to top end 12 and shaped in a cross-sectional form similar to that of top end assembly 12, i.e. circular or polygonal, such that walls 16 connect each end of shoulders 30 to create the enclosed container vessel 10. Bottom end assembly section 14 comprises one or a plurality of channels 28 that are indented as grooves distributed between bottom shelf sections 30. Channels 28 extend a length of either partial or full distance from the wall 16 edge to an edge of vertical interconnection receptor 32. Channels 28 are preferably oriented and arranged to receive like-sized ridges 24 from a top end section of a similarly-constructed separate container 10. Together, ridges 24 and the channels 28 also provide for faster and proper alignment when stacking one container 10 upon another vertically via a "click-feel" type of fit. A small fit tolerance between top assembly 12 and bottom end assembly 14 is designed so as to create snugness, thereby limiting side-to-side "rocking" and minimizing wasted container capacity. It should be noted that, in certain embodiments, the position of ridges 24 and channels 28 can be swapped, i.e., the channels 28 indented into top assembly 12 and ridges 24 formed on bottom assembly 14. In alternative embodiments, channels 28 are arranged in different patterns or substituted with circular or geometrically-shaped pegs and indents which are arranged to fit one another with the "click-feel" type of connections.

Vertical interconnection receptor 32 is formed as an indent into the bottom end assembly 14 of the container with a diameter large enough to receive a cap 22 and ring 18 from a similar container 10. Receptor 32 also has a limiting edge 33 with a diameter small enough to operate as a stop against ring 18 during vertical interconnection with another container 10. The interlocking nature of ridges 24 on a first container to channels 28 on a second separate container, and cap 22 on a first container to receptor 32 on a second container promote stable alignment of certain elements of horizontally connected and vertically stacked containers. In some embodiments, the surfaces of top assembly 12 and bottom assembly 14 are slightly coarse or rough to provide additional friction for connectivity and stability during vertical stacking.

Figure 5:
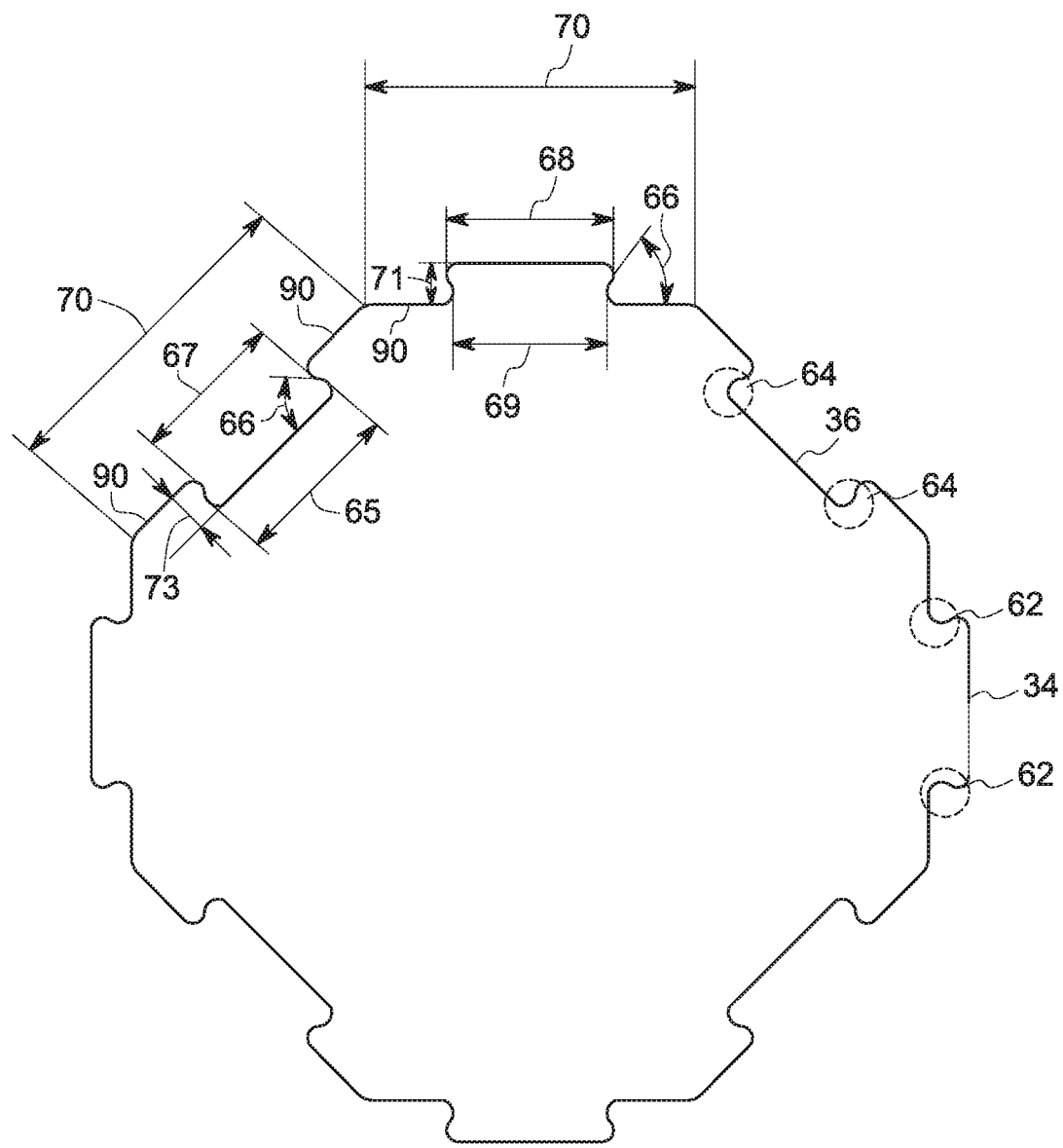
FIG. 5 is a detailed view of exemplary undercuts for lateral connectivity of a container.

In the embodiments, container 10 further provides a mechanism for lateral connection with other containers or devices in a slidable, interlocking manner. Lateral connection of multiple containers is enabled by tongue 34 and groove 36 connectors distributed in multiple locations laterally along wall 16. Each groove 36 is indented into wall 16 and formed to receive a tongue 34 from a second container or device having similar connectivity features. Tongue 34 and groove 36 are formed into the sides 16 in a perpendicular orientation to the top assembly 12 and the bottom assembly 14. Grooves 36 and tongues 34 are shown alternating on sides of octagonal walls 16, where a groove is placed on every other octagonal wall with tongues placed in a similar alternating design. Alternatively, one or more tongues 34 could be formed on one or more of the sides and one or more grooves 36 formed on the remaining sides of walls 16. In other embodiments, a container 10 may have only grooves 36 on its respective side walls 16 while other containers 10 may have only tongues 34 formed in their respective side walls. Regardless of the distribution patterns, separate containers can b e interlocked in a tongue-to-groove connection. Connector tongue 34 is a raised, flat, or slightly rounded protrusion having formed on wall 16. As shown in FIG. 5, an interlocking mechanism is created using undercuts 62 of each tongue 34 that can be received into expanded cuts 64 of each groove 36. Undercuts 62 are formed such that tongue 34 connects to wall 16 with a narrower base than the width of tongue 34 at its outermost portion. Because groove width 65 is longer than width 67, when two containers are connected via longitudinal movement of sliding a tongue into a groove, the width of the edges of the tongue lock laterally behind each undercut 64. Once interlocked, the two containers cannot be separated, or pulled apart, horizontally and can only be separated by sliding the tongue out of the groove longitudinally. While each container 10 has at least one tongue 34 or at least one groove 36 in order to interconnect, embodiments can include more than one groove and/or more than one groove on a single container 10.

Referring again to FIG. 5, a detailed view of exemplary undercuts for lateral connectivity of a container is illustrated. Tongue 34 is formed with undercuts 62 in order to provide sliding interconnectivity with a similar container having a groove 36 with undercuts 64. However, tongue undercuts 62 and corresponding groove undercuts 64 create difficult corners around which thermoplastic material must flow in the stretch molding process when manufacturing a container 10 with such material. It is therefore desirable from a manufacturing perspective to have a container design with the least possible angled degree 66 of undercuts and yet still provide secure interconnectivity among containers. The resulting minimal undercut angles, in turn, require very tight precision in the shape and fit tolerances between tongue 34 and groove 36 (more severe undercuts, if viable, would allow greater shape and fit tolerance between components of connected vessels). For the purpose of interconnectivity, an undercut angle 66 between about 30° and about 75° is sufficient to hold opposing container units in an interlocking manner. However, these ranges are the preferred angles and undercut angles below and above this range and the dimensions stated below are within the scope of the claimed invention as long as two separate devices with the interconnectivity mechanisms described herein can remain interconnected. In certain embodiments, the groove-tongue assemblies are of modest size. In an exemplary embodiment, each wall face 70 of octagonal container 10 is about 25 mm wide and each tongue width 68 or groove width 65 is about 12 mm at their widest points. Furthermore, as will be appreciated by those skilled in the art, dimensions mentioned herein are relative and can vary depending on the size of a container, the cross-sectional polygonal or circular shape of wall 16, materials of manufacture, and other manufacturing or connectivity factors. The above factors result in a greater risk of groove-tongue disengagement as the undercut angle 62, 64 nears an upper end (e.g., about 759 of the aforementioned range, and especially where tongue-groove assemblies are of modest size. In contrast, the greater connectivity resulting as the undercut angle 62, 64 approaches the lower end (e.g., about 309 of the aforementioned range r enders molding and de-molding more difficult during manufacture. Thus, a tradeoff exists between the two aims of solidly holding undercuts on the one hand and easier molding/de-molding on the other. Further, the fit tolerance (or "air gap dimension") between grooves 36 and tongues 34 can range from about 0.05 mm to about 1.0 mm, depending largely on the severity of the undercut angles. For example, in one embodiment, the undercut angle 66 is set at about 65 degrees with a fit tolerance or air gap dimension of about 0.05 mm.

Further, a difference in width of the narrowest part of the neck 69 of tongue 34 and a widest width 65 of groove 36 should allow a slidable connection to be maintained between two different containers without a tongue 34 being able to slip out of a groove 36 if the two containers were pulled horizontally away from one another. The protrusion distance 71 of tongue 34 away from wall 16 and likewise depth 73 of groove 36 may vary but should not be so small as to prevent the interlocking of two similar containers.

Figure 6:
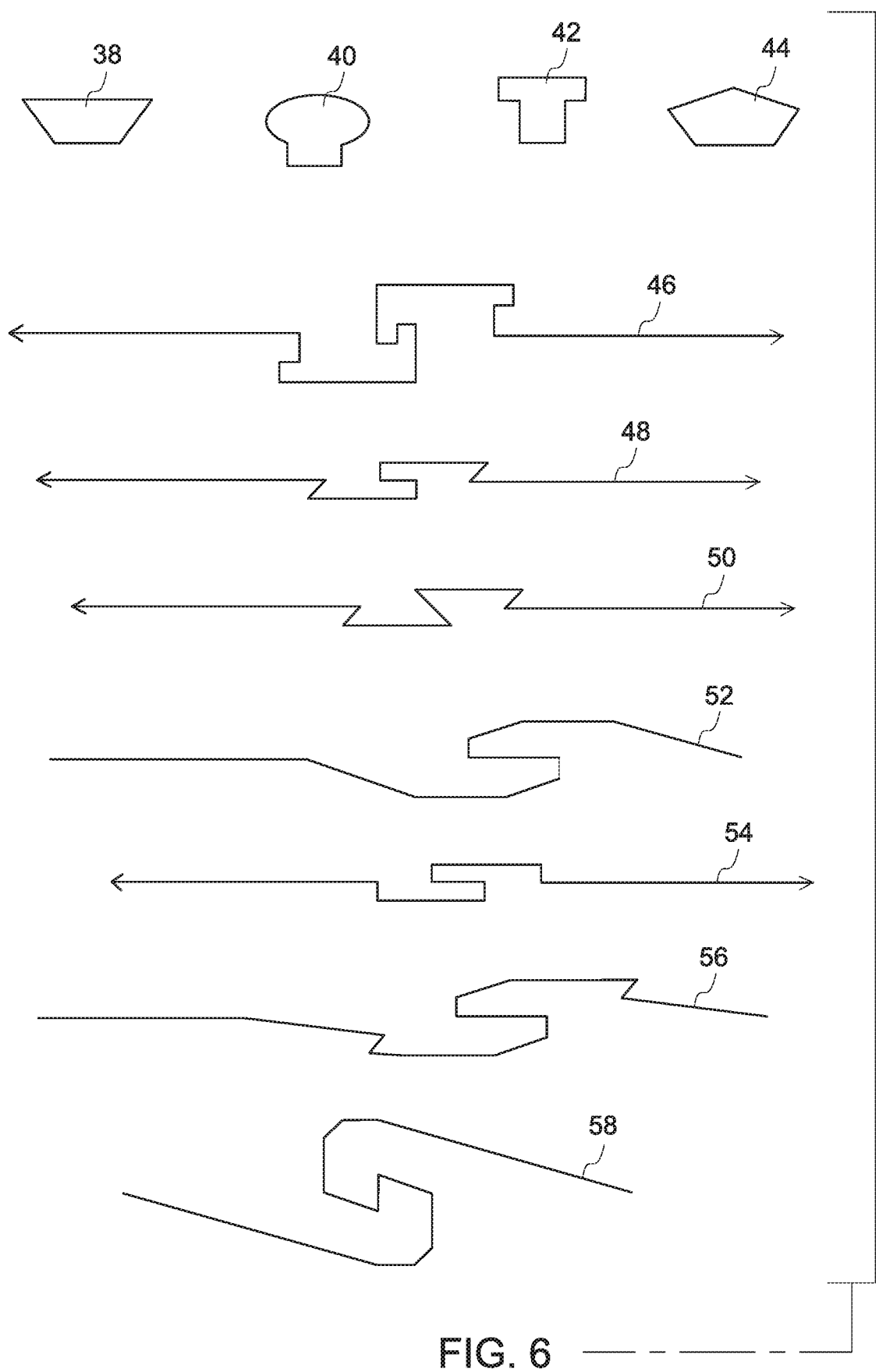
FIG. 6 illustrates multiple embodiments of undercuts and lateral interlocking mechanism designs.

In certain embodiments, lateral interconnectivity may be enabled by any of a number of hermaphroditic, longitudinally sliding connection mechanisms (interlocks having an integrated groove and a tongue) present on each of the sides of the container 10. FIG. 6 illustrates various cross-sectional views of alternative embodiments for tongue and groove connectors. Connectors 38, 40, 42, 44 represent designs of tongue and groove connections between two or more containers. Alternative interlocks 46-58 are each "hermaphroditic," meaning they possess both tongue and groove aspects in a single connector assembly. One skilled in the art will recognize that alternative embodiments of tongue 34 and groove 36 or the shape of the interlocks shown in FIG. 6 could be a design construction of any shape that allows for interlocking of the sides of the containers.

Further, it should be noted that the tongue 34 and the groove 36 or the interlocks may extend a partial or full length of the side 16. In the illustrated embodiments, the tongue 34 extends a partial length of the side 16 while the groove 36 extends the full length of the side 16. This particular design consideration allows for ease of manufacturing while still providing the ease, flexibility, and sturdiness of the interconnections. As described in related applications, in embodiments of a certain size, a recess or an indention may be provided into one of the sides 16 having a tongue 34 with adequate concave space so as to provide clearance for a person's hand to grip tongue 34. This enables a user to hold and manipulate the container more easily, especially with larger and heavier versions. In either case, allowing tongue 34 to fade out short of the full length of the vessel side creates a plane area below tongue 34. The flat space facilitates alignment and lateral interlocking of two vessels 10 by allowing the user to steady the plane area of one vessel against a second vessel before maneuvering tongue 34 into a top of groove 36 and then sliding the tongue 34 in a downward motion into groove 36. Container 10 also comprises wider openings for a short span at the uppermost portion of grooves 36, working with plane 35 to enhance even further the ease of alignment and insertion of corresponding tongues 34 into grooves 36. In other embodiments, grooves 36 have a stop that prevents a tongue 34 from sliding completely free through a groove 36, thus locking lateral connectivity in one direction. In still other embodiments, groove 36 or tongue 34 edges are flexible allowing a tongue 34 to click-fit into a groove instead of sliding laterally.

Figure 7:
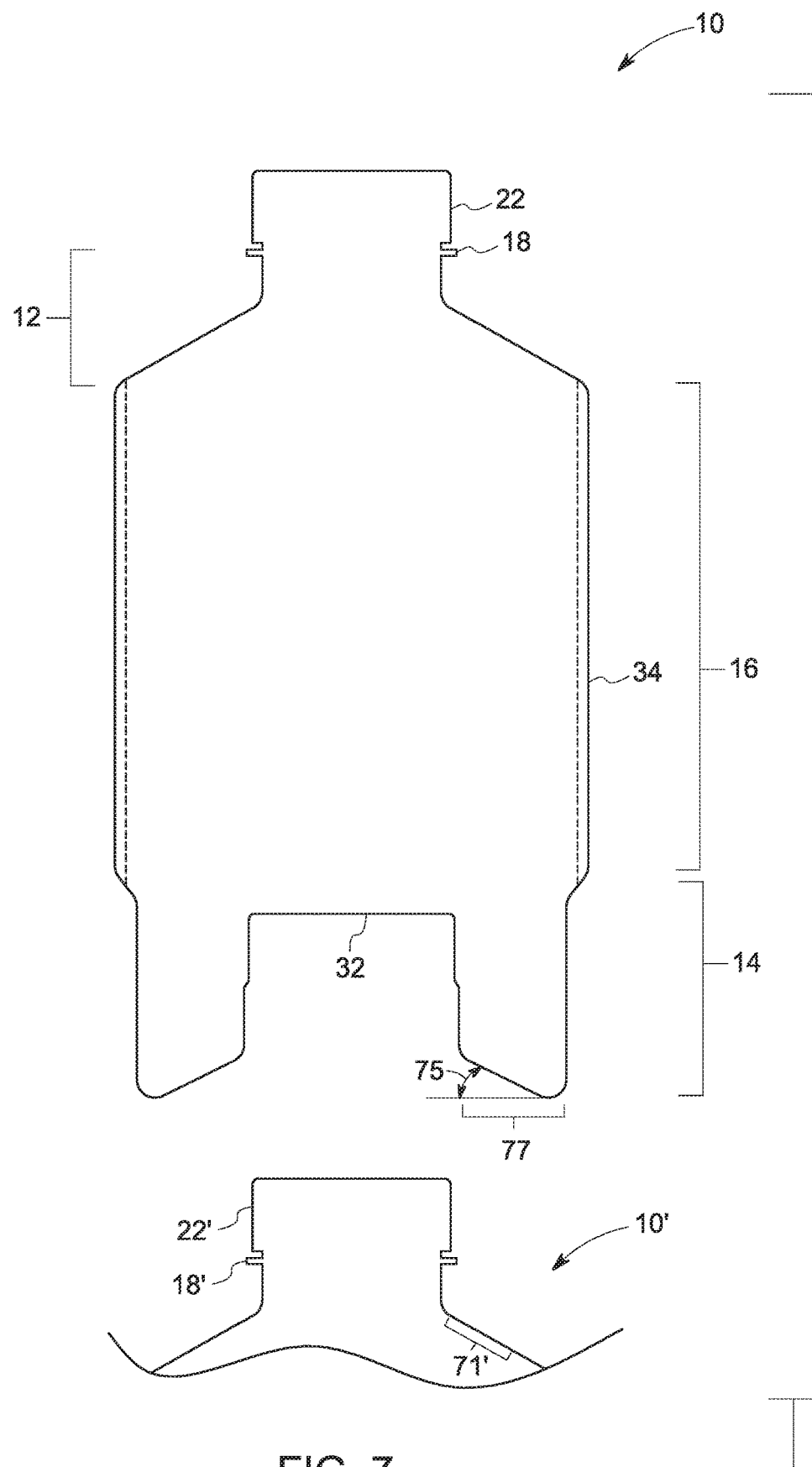
FIG. 7 is a simplified cross-sectional side view of an exemplary container to further illustrate vertical interconnectivity features.
Figure 8:
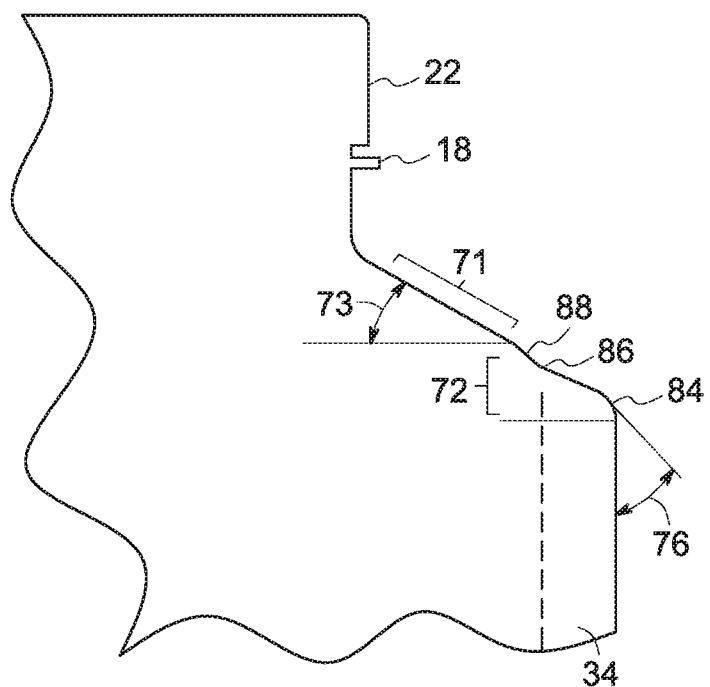
FIG. 8 is a more detailed side view of the container of FIG. 6 illustrating top portion interconnectivity features.
Figure 9:
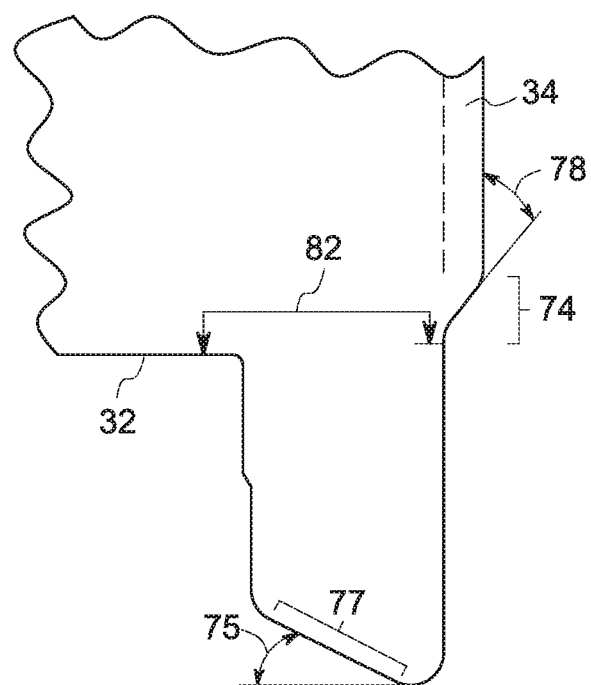
FIG. 9 is a more detailed side view of the container of FIG. 7 illustrated bottom portion interconnectivity features.

Referring to FIGS. 7, 8, and 9, top and bottom end formations of tongues 34 are illustrated as blending or leading in and out at their lateral ends. In FIGS. 8 and 9, these elements are shown in a partial side view of top assembly 12 and bottom assembly 14, respectively. In order to facilitate thermoplastic flow into a mold and also to ease de-molding, the design for tongue 34 includes these sloped blendings, lead-ins or fade-outs to the tongues 34 at the top 72 and tongue bottom 74. A challenge in forming the lead-ins/fade-outs is to determine the appropriate slope for such transitions, recognizing certain trade-offs related to the manufacturing of container 10. The principal trade-off is that while more gradual slope angles 76, 78 suggest easier material flow and vessel de-molding, steeper slope angles 76, 78 preserve more functional tongue length for a greater span of interconnectivity with corresponding grooves 36. With these factors in consideration, it has been determined that workable configurations in slope angles 76, 78 range preferably from about 30 degrees to about 70 degrees; however, ranges could vary below or above these amounts and still stay within the scope of innovative design of the embodiments.

Referring again to FIGS. 8 and 9, an angle 73 that determines the height of the shoulder/cap rise 71 serves as a vertical connecting mechanism for top end section 12 to abut the bottom end section 14 rise 77 at angle 75 leading to vertical interconnection receptor 32 from a similar container. As illustrated in FIGS. 5 and 8, cavity rise angle 75 should match the shoulder rise angle 73 so that receptor shoulder 77 of one container will seat evenly against shoulder rise 71 of a second container 10' thereby assisting vertical interconnectivity. One design element to account for is that the higher the rise of these components from horizontal, the more difficult the flow of thermoplastic material into the bottom-most extremities during the molding process. Thus, the angle 73 of the shoulder rise 71 is no steeper than minimally necessary: (a) to allow proper flow of thermoplastic materials to the outer edge of top end section 12 and to the bottom end section 14 of the container 10 during the molding process; (b) to provide adequate compressive strength and transfer of vertical force; and (c) to allow proper flow of liquid or pourable (e.g., granular or powdered) solids out of the finished vessel. A likely functional range of shoulder rise angles is determined to be between about 1:4 and about 1:1 (otherwise expressed to be between about 18 degrees and about 45 degrees). However, these ranges are merely exemplary and actual ranges could vary higher or lower without deviating from the scope of the claimed invention. In certain embodiments, the shoulder rise is selected to be about 1:2 or about a 30 degree slope. This value is intended to deliver considerable compressive strength (further enhanced by spine ridges 24) while facilitating adequate flow of thermoplastic molding material into the shoulder area 71 of top end section 12 as well as adequate flow of liquid or pourable solids out of the finished container 10.

The design of tongue 34 and groove 36 takes into close consideration the tradeoff between (a) the desirability of the widest possible groove/tongue to allow easier thermoplastic flow during molding and (b) the need to leave enough width in the remaining wall spaces 90 between adjacent grooves and tongues to allow smooth flow of material into those zones as well. For one exemplary embodiment of vessel 10, a functional range of tongue width 68 is determined to be between about 6 mm and about 15 mm, or a proportional measure similar to the span 90 between adjacent grooves and tongues. Groove dimension 65 at its widest point is slightly wider than tongue head width dimension 68 to facilitate sliding interconnectivity. Likewise, groove overhang dimension 67 is slightly wider than tongue neck 69 to facilitate interconnectivity. In one embodiment, the groove/tongue widths employed are about 12 mm, thus providing about 12 mm span 90 between each consecutively arranged groove and tongue. Containers with larger dimensions would reflect proportionally wider grooves 36 and tongues 34, and proportionally wider spans 90 between adjacent grooves 36 and tongues 34.

The tongue and groove configuration may be customized based on design of the container and its applications. In certain embodiments, the tongue-to-groove ratio is configured so as to maximize the number of lateral connections that can interlock with additional containers. For example, approximately a 7:1 ratio of grooves-to-tongue in an octagonal embodiment, or approximately a 3:1 ratio in a four-sided embodiment each allows a multiplicity of lateral connections. Further, in certain embodiments, there may be two or more tongues 34 in parallel and corresponding number of grooves 36 in parallel on the sides of an exemplary polygonal container. The grooves are shaped and spaced to slidably receive the two or more tongues from an adjacent container. The same two or more interlocks in parallel on each of the sides of a container enables the containers to interlock with connecting containers at an offset, thereby providing greater interlocking strength and greater flexibility in construction designs. For example, a pair of interlocks or a pair of tongues and grooves combination enables the containers to interlock with two connecting containers at a time and at an offset of approximately 50%.

As described above, the containers are designed to interconnect both laterally and vertically. In the latter case, the connection is achieved by inserting the top of one container into a matching receptor space in the base of another container. The depth of internal rise of the receptor space 32 creates a potential encumbrance or related difficulties for thermoplastic flow into the far reaches of the container mold. The presence of complex lateral groove 36 and tongue 34 configurations along the vessel walls 16 renders that challenge even more difficult, especially near the container bottom end section 14, where grooves 36, tongue protrusions 34, and the internal receptor space 32 are all in close proximity. One way to alleviate this molding difficulty is to shorten the length of tongues 34, thereby lessening the design complexity below the tongue fade-out point, resulting in easier materials flow into the bottom portion of the adjusted mold. It should be noted that the essential logic of the vessel design (i.e., vertical slide-through side-to-side interconnectivity) negates a similar shortening of the grooves 36. In certain embodiments, the lowest point of tongue 34 ends at approximately the same elevation as the highest reach 82 of the internal receptor rise 32. Further, the tongue fade-out 74 should optimally end approximately near to the height 82 of the bottom internal receptor space 32; however, the fade-out 74 may be higher or lower than exact height 82 of receptor space 32 without deviating from the scope of the claimed invention. In one embodiment, a range of about 5 mm is provided. However, an actual range could be higher or lower without being limiting to the scope of the embodiments. A spring-point 84 of tongue taper 72 begins approximate to an edge where the upward-sloping section of rising top end shoulder 12 meets perpendicular wall 16. The location of spring-point blend 86 where taper 72 meets top-end shoulder 12 depends on a length of taper 72 and angle of taper 76. In one embodiment, the spring point of blend 86 is located about 4 mm to about 5 mm above the spring point 84 of tongue taper 72. However, this range is merely exemplary and actual ranges could vary higher or lower without departing from the scope of the claimed invention.

Figure 10:
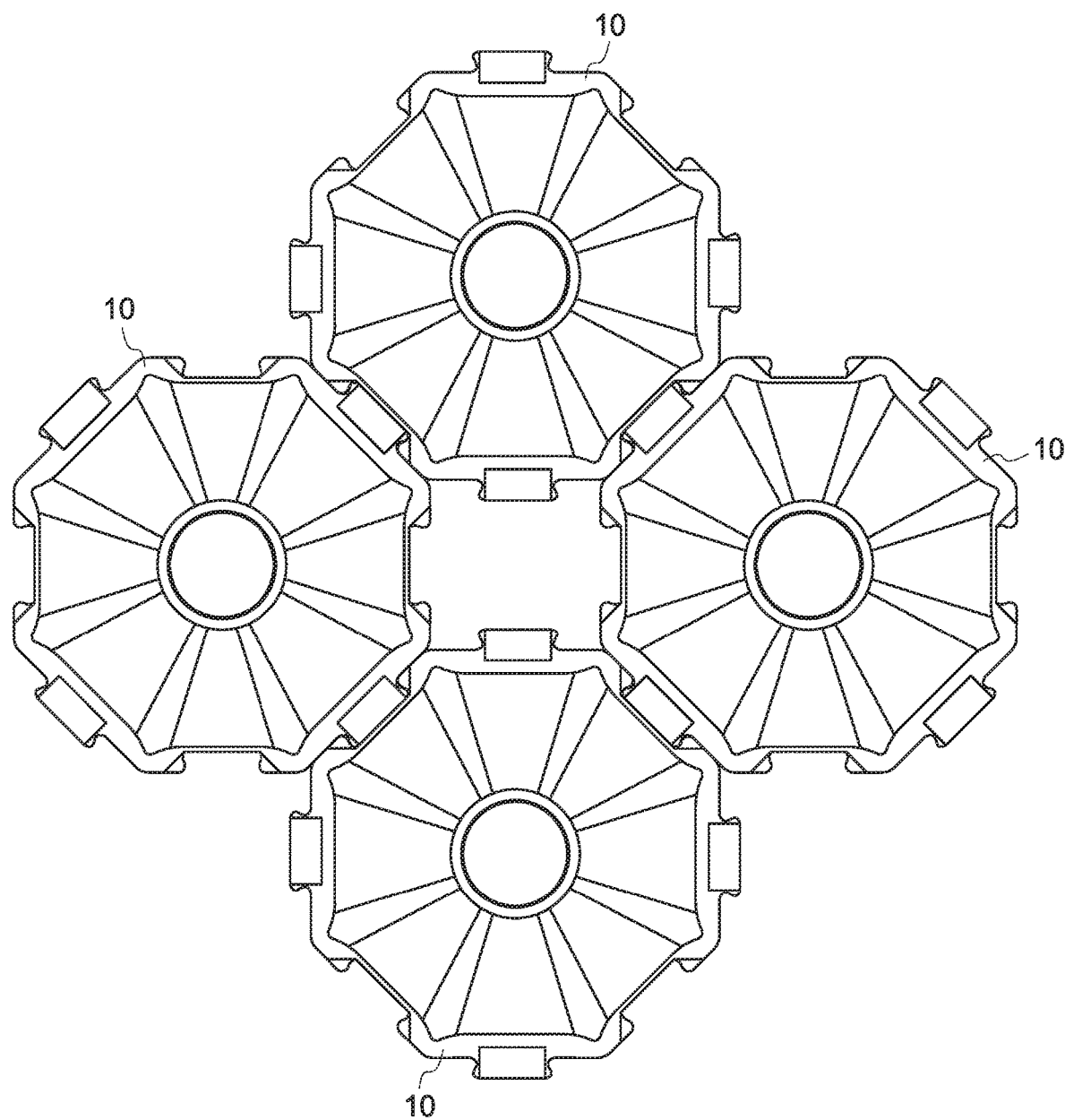
FIG. 10 is a plan view of multiple exemplary containers interconnected horizontally.
Figure 11:
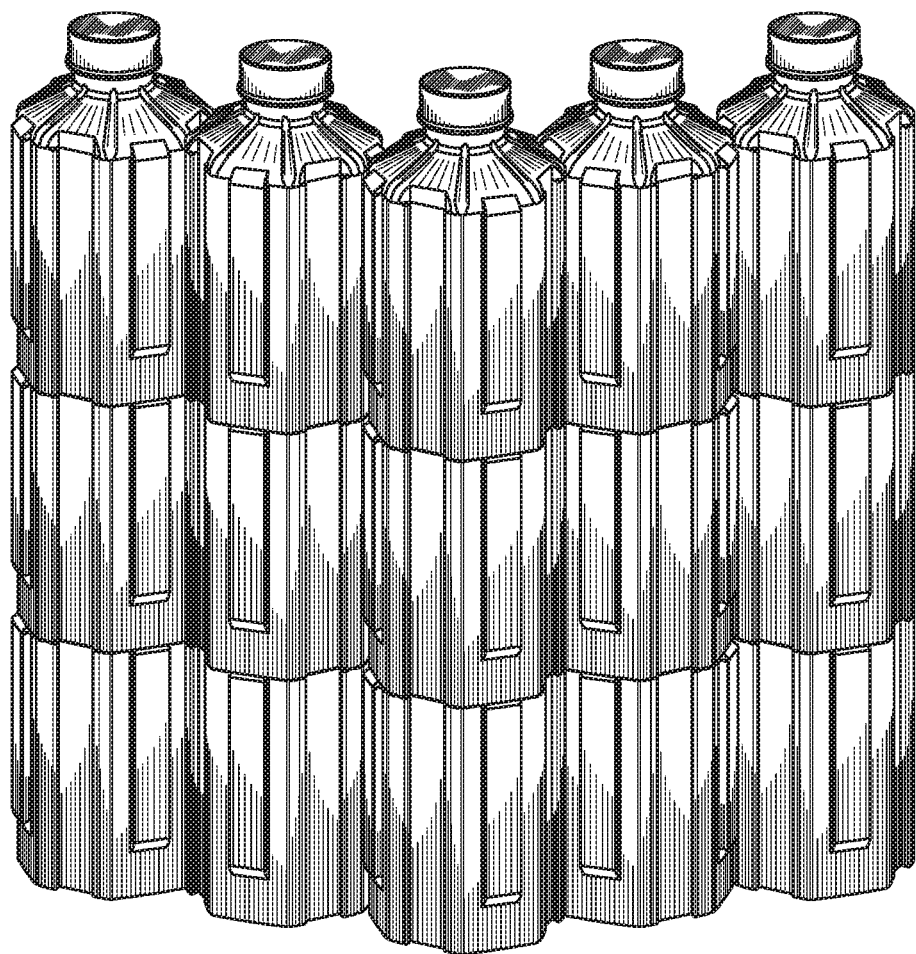
FIG. 11 is a view of multiple exemplary containers interconnected vertically and horizontally.

A plurality of devices having the connectivity mechanisms described herein may be interconnected by stacking them vertically (in FIG. 11) as well as horizontally (in FIG. 10). To illustrate, FIG. 7 shows bottom end receptor 32 of a first container 10 that can receive a cap 22' secured to protruding neck 20' on a top-end section 12' of a second container 10'. Top-end assembly 12' on the lower container 10' makes frictional contact with receptor space 32 of the upper container 10. Such vertical stacking requires adequate compressive strength in the neck and wall structures of a container. Moreover, the side-to-side connection between grooves 36 and tongues 34 in these containers are more easily attained where top-bottom connections result in well-aligned sides, i.e., where grooves/tongues of a given lower unit 10' are aligned with the grooves/tongues of the container above, thus presenting a continuous insertion path for corresponding grooves/tongues of additional containers having similar groove/tongue dimensions. Thus, it is desirable that the finished containers include some effective means to facilitate such alignment. One such means is to provide for a series of regularly-spaced spines or ridges 24 on a top end shoulder section 12 radiating outward from the base of the container neck 20. As explained previously, the corresponding series of regularly spaced channels 28 are provided radially on the inwardly sloping bottom end 14 of the container to receive ridges 24 from a separate container. Fitting ridges 24 and channels 28 together also assists in the alignment of the tongues and grooves when stacking multiple container units, such as shown in FIG. 11.

The receptor or indented connecting profile comprising bottom assembly 14 reduces the volume per unit of vessel height. In order to minimize volume loss and, relatedly, to ensure height-to-width proportionality and resulting vessel stability, it is critical to reduce as much as reasonably possible the height of receptor space 32. It should be noted that minimization of the bottom receptor 32 is a function of minimizing the size of the corresponding vessel neck assembly, including neck rise 20, transfer ring 18, tamper evident ring (where needed) and cap closure 22, together an assembly which connectively inserts into bottom receptor 32. Generally, the narrower and shorter such a neck assembly is formed, the smaller the corresponding bottom receptor space 32, thereby reducing volume loss and compensating container height.

A container 10 may be placed into commercial distribution. It is therefore desirable to provide adequate spaces on the exterior surface of container 10 for printing, stamping, or affixing labels, marks, identification of manufacturer, content list, advertisements, images, and other useful information. The complexity of the design, with its several prominent surface folds, makes meeting such labeling needs more challenging. As discussed above, the shortened length of tongue 34 provides below each such tongue a flat rectangular area suitable for printing critical information and/or images directly onto the vessel surface or otherwise for affixing an informational sticker, wrapper or banner. Typically, adequate sizes for such an area range from about 15 mm to about 50 mm per surface side (i.e., from about 225 $mm^2$ to about 2,500 $mm^2$). The flat surface under each of the tongues 34 on a container design with a capacity of approximately 250 mL is about 21 mm×21 mm (i.e., about 441 $mm^2$). Containers of larger dimensions would reflect proportionally larger surface areas for the stated purposes.

Further, the containers 10 may be fabricated in various standard volumetric and physical sizes as described in greater detail in co-pending application PCT Application Serial No. PCT/US10/46060, which is incorporated by reference. These varying sizes of containers maintain an identical depth in their footprint for ease of interlocking with one another and with containers or devices of other sizes, thereby retaining universal interconnectivity. The embodiments may include a variety of volumetric capacities such that an arrangement of different containers side-to-side would be similar (the heights of containers having different capacities will likewise differ). In short, each container retains interchangeable side-to-side interconnectivity and retains top-to-bottom vertical interconnectivity. One skilled in the art will recognize that the perfect scalability of the containers can yield a large number of volumetric capacity ranges and combinations. Moreover, in certain embodiments, the number of grooves and tongues or the number of interlocks on each of the sides of the container may be two or more, which provides for greater flexibility in building a wall of containers at varying angles other than 90 degrees. Additional grooves and tongues may also be provided on each side provide of a container for increased interlocking strength.

As an exemplary embodiment, the octagonal container 10 illustrated in FIG. 1 comprises four tongues and four grooves. Strength of vessel construction is achieved in this design due to (1) twenty-four folds created by eight corners and eight connectors (each tongue and each groove has two folds), and (2) at the top and bottom assemblies, eight spines/ridges and eight corresponding grooves. The pattern resulting from all such features retains symmetry in design, a quality allowing all the advantages of mass manufacturing and ease of assembly with other similar containers in addition to achieving great design flexibility in building structures. For example, the enhanced connectivity of the 4:4 octagonal vessel 10 allows structures with walls departing at both/either about 90 degree and about 45 degree angles; consequently, resulting structures need not be restricted to those with squared or rectangular outlines. The aforementioned strength of the unitary vessels, drawn from the numerous folds in the form, in turns lends decided robustness to structures made from multiple such units.

Because container 10 is scalable, the range of workable measurements is also scalable. At the smaller end of volumetric container scale (approximately 250 mL), effective top-bottom connectivity of the vessels results where measurements of the top portion neck-cap assembly and corresponding bottom receptor space have a height in the range of about 17 mm to about 40 mm and width in the range of about 29 mm to about 50 mm. In one exemplary embodiment, the container design incorporates the slightest available neck assembly. For example, for a container with a capacity of approximately 250 mL the design considerations may be as follows: (a) a straight wall neck section 20 descending from the bottom of the transfer ring 18 of about 5 mm; (b) the diameter of a transfer ring 18 of about 29.25 mm; (c) the diameter of both twist cap closure 22 and tamper evident ring about 27.92 mm, and; (d) a rise from the transfer ring 18 to top surface of twist cap closure 22 of about 12 mm. However, it should be noted that because the shape and size of the container is scalable, these dimensions should not be read in a limiting sense; one skilled in the art will recognize that container volumes other than 250 mL may incorporate changes to measurements in proportional or reasonably proportional fashion.

As an example a functional range for the size and contour of such spines or ridges 24 and corresponding channels 28 is: about 2 mm to about 10 mm in width and about 0.5 mm to about 5 mm in height where ridge 24 departs neck 20, and; about 4 mm to about 20 mm width and about 0.5 mm to about 10 mm in height where ridge 24 base meets the shoulder turn point 88. A minimal fit tolerance/air gap dimension is formed at the corresponding channels 28. In one exemplary embodiment, the size and contour of ridges 24 and corresponding channels 28 for a container 10 with a capacity of approximately 250 mL is: (a) about 2.7 mm width and about 1 mm height where the ridge 24 departs the neck 20 of the container; (b) about 5.25 mm width and about 1 mm height where the ridge 24 base meets the shoulder turn point of container 10; and (c) about 0.05 mm fit tolerance/air gap dimension at the corresponding channels 28. The topographical curves of spines or ridges 24 must be such that lateral de-molding is not hampered. Containers or vessels of larger volumetric capacity and dimensions might incorporate proportionally higher and broader ridges/channels. As one skilled in the art can determine, these ranges are merely exemplary and can increase or decrease without falling outside the scope of the claimed invention.

Figure 12A:
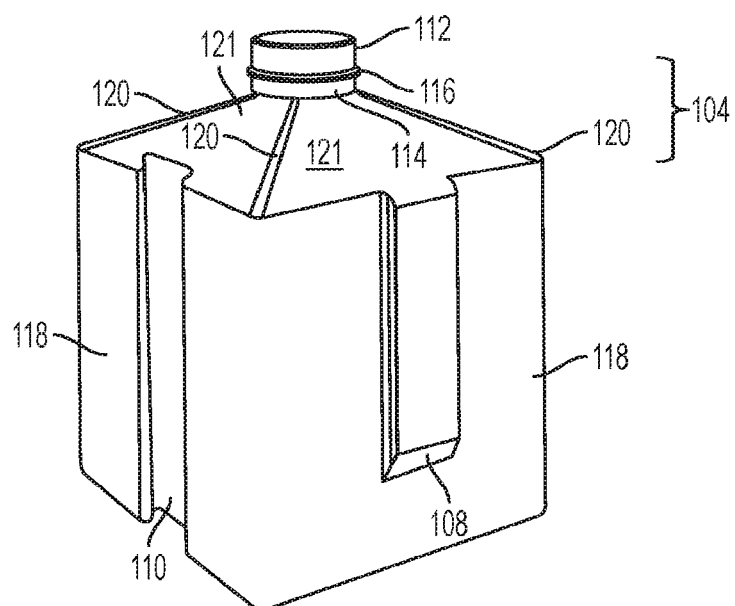
FIGS. 12A and 12B are perspective views of alternative embodiments for a cuboid interlocking container.
Figure 12B:
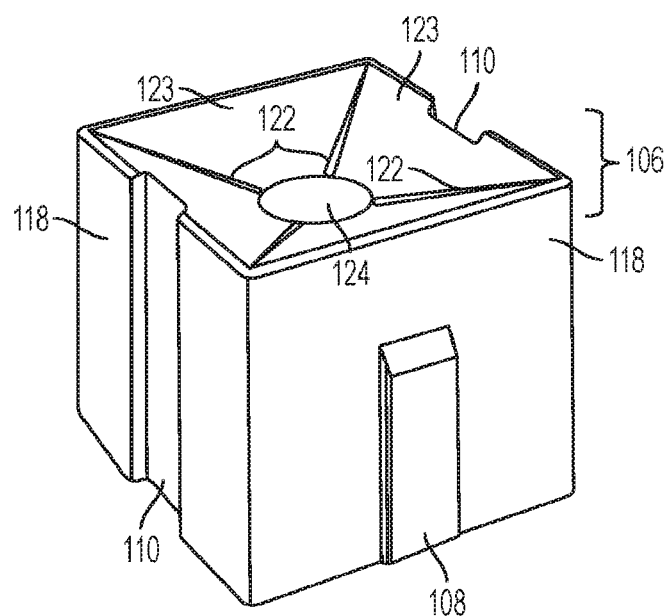

FIGS. 12A and 12B illustrate an alternative embodiment to the modular interlocking container of FIG. 1. Container 100 is a design using a square footprint (with or without slightly rounded corners) as the polygon of the base and retains the lateral and vertical interconnectivity mechanisms described herein in relation to container 10. Top end assembly 104 and bottom assembly 106 attach to square wall 118 to form a hollow or partially hollow vessel or container 100. The embodiment is designed for filling with a fluid or any other material that can be poured through an access opening formed by neck 114. A cap 112 is provided to seal the opening. The cap 112 may be screw-on using threads, snap on, or any type of seal that could form a seal to hold contents. When sealed with cap 112, container 100 could be water-tight such that it is amenable for use in transporting liquids (e.g., water or cooking oil), or adequate to hold granulated or powdered goods (e.g., grains, seeds, flour), household materials (e.g., soap, cleaners), or construction materials (e.g., cement, sand). Top assembly 104 is formed with a pyramidal rises as shoulders 121 from each top-edge of upright wall 118 to converge at neck 114 at the apex. Such a pyramidal top end shaped by shoulders 121 provides for controlled and complete refilling of container 100. Top assembly 104 has spines or ridges 120 arising from each vertex of wall 118. In certain embodiments, these ridges 120 provide additional resistive or compressive strength regarding the weight of one or more similar containers that may be vertically stacked on top of container 100. Further, these ridges allow for additional interlocking of vertically stacked containers, thereby providing for additional strength, alignment and stability.

The bottom end assembly 106 is shaped in a pyramidal form with a similar should rise 123 angle to that of top assembly 104, forming a receptor space 124 such that the bottom 106 can receive a top 104 of similar container that is vertically stacked below the container 100. The bottom assembly rise has channels 122 formed at each vertex of the polygon and end at the receptor space. The channels 122 are configured so as to receive the ridges 120 of another container. Similarly, the receptor space 124 is formed so as to receive the neck 114 and the cap 112 of another container vertically stacked below the container 100. It should be noted that for any of the embodiments herein, the position of ridges 120 and channels 122 can be reversed, i.e., with the channels in the top assembly and the ridges on the corresponding bottom assembly. Alternatively, in the embodiment, the top end section 104 and the bottom end section 106 have protruding pegs and indentions, respectively, for vertical interconnectivity. In other embodiments, end sections include a ridge (slightly raised above top end flat surface) and a corresponding groove for greater interconnection strength. A lid, screw cap, or 'pop-top' mechanism may be formed into top-end to allow access to the content of the container. Top end section 104 and bottom end section 106 could alternatively be made flat in certain embodiments while incorporating vertical interconnectivity features.

Figure 13A:
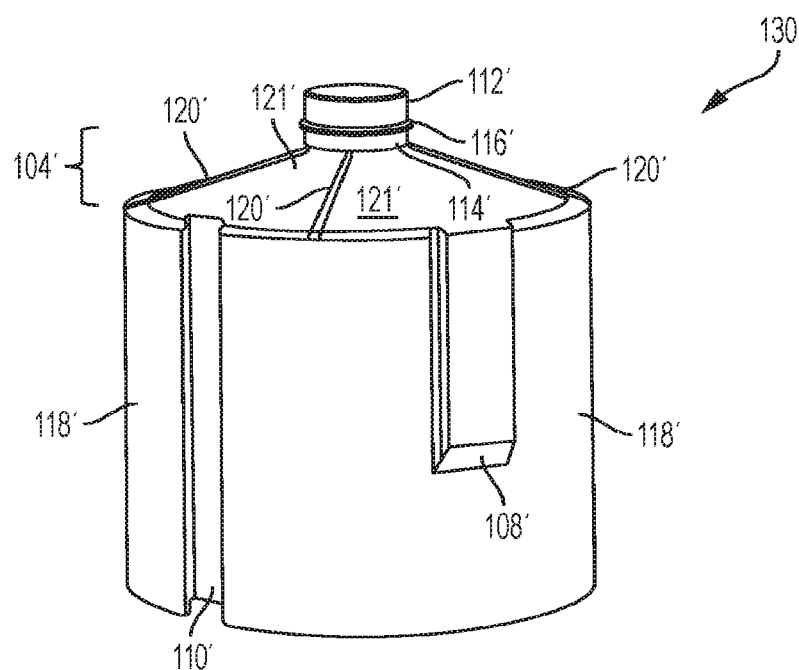
FIGS. 13A and 13B are perspective views of alternative embodiments for a cylindrical interlocking container.
Figure 13B:
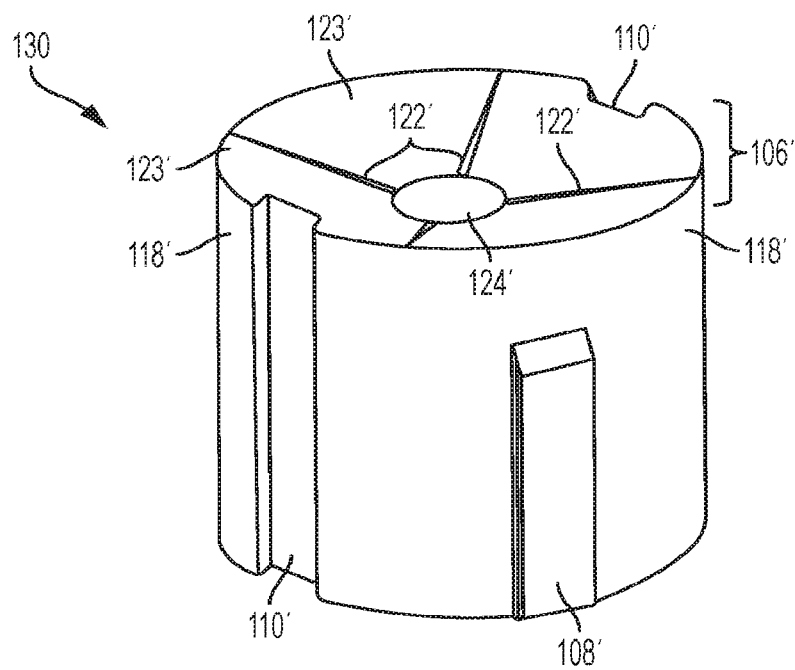

FIGS. 13A and 13B illustrate an additional alternative embodiment of the present invention. Instead of octagonal or square walls, the container 130 comprises a single, cylindrical longitudinal wall. In all other aspects including interlocking vertical and horizontal interconnectivity features, container 130 has features similar to the preferred and alternative embodiments described in relation to FIGS. 1 through 12. Top end assembly 104' and bottom end assembly 106' attach to square wall 118' to form a hollow or partially hollow vessel or container 130. The embodiment is designed for filling with a fluid or any other material that can be poured through an access opening formed by neck 114'. A cap 112' is provided to seal the opening. The cap 112' may be screw-on using threads, snap on, or any type of seal that could form a seal to hold contents. Top assembly 104' is formed with a circular shoulder rise 121' from the top-edge of upright wall 118' to converge at neck 114' at the apex. Such a pyramidal top end shape provides for controlled and complete refilling of container 130. Top end assembly 104' has spines or ridges 120' arising from vertex of wall 118'. In certain embodiments, these ridges 120' provide additional resistive or compressive strength regarding the weight of one or more similar containers that may be vertically stacked on top of container 130. Further, these ridges 120' allow for additional interlocking of vertically stacked containers, thereby providing for additional strength, alignment and stability.

The bottom end assembly 106' is shaped in a circular form with a similar shoulder rise angle to that of top assembly 104', forming a receptor space 124' such that the bottom 106' can receive a top 104 of similar container that is vertically stacked below the container 130. The bottom assembly rise has channels 122' formed at each vertex of the polygon and end at the receptor space. The channels 122' are configured so as to receive the ridges 120' of another container. Similarly, the receptor space 124' is formed so as to receive the neck 114' and the cap 112' of another container vertically stacked below the container 130. It should be noted that for any of the embodiments herein, the position of ridges 120' and channels 122' can be reversed, i.e., with the channels in the top assembly and the ridges on the corresponding bottom assembly. Alternatively, in the embodiment, the top end section 104' and the bottom end section 106' have protruding pegs and indentions, respectively, for vertical interconnectivity. In other embodiments, end sections include a ridge (slightly raised above top end flat surface) and a corresponding groove for greater interconnection strength. A lid, screw cap, or 'pop-top' mechanism may be formed into top-end to allow access to the content of the container. Top end section 104' and bottom end section 106' could alternatively be made flat in certain embodiments while incorporating vertical interconnectivity features.

Method or Process of Manufacturing

As stated above, once the container has been manufactured by employing the techniques described above, an additional challenge may be to decouple the standard three part mold without tearing or otherwise damaging the container. Several considerations may be taken toward decoupling of molds from the finished product as will be described in greater detail below.

Most containers formed via ISBM emerge from three-part molds. Two laterally moving mold parts (either directly opposing or "clamshell" hinged) normally comprise the largest portion of the mold, engaging (and disengaging) at a point immediately beneath the blow ring, and extending downward for the great majority of the container length. The third mold part—which can be described as the "push-up" or bottom insert—forms the relatively short bottom portion of the vessel, engaging and disengaging vertically. Because most ISBM formed container bases have at least a slight recession or indentation (in essence, an undercut), the bottle mold cannot disengage without that third mold part vertically withdrawing. In order to provide multi-directional interconnectivity to the containers of the present invention, it is desirable to incorporate a series of undercuts along the lateral surfaces and a large recession undercut at the base meant to receive the top-side shoulder/cap configuration of other like units. These features render considerably more complicated the standard method of mold decoupling, i.e., via a two-part laterally moving mold covering the majority of the vessel surface, supplemented by a short stroke vertically moving bottom mold piece.

In a reversal or inversion of the logic of the standard approach, the mold decoupling for the current container designs requires (a) a pair of opposing mold parts (not clamshell hinged) engaging just below the blow ring but extending downward only to the shoulder turn of the intended vessel, and (b) a long-stroke bottom "cup mold" engaging and disengaging vertically until reaching the aforementioned shoulder turn line. The longer bottom push/pull stroke requires selective modification of currently available molding equipment. More specifically, such modifications include a bottom stroke assembly sufficiently long to vertically disengage the part of the mold forming the entire vessel from its bottom to the start of the shoulder, with the two laterally moving mold parts only forming the shoulder and covering the neck of the vessel.

The vertically closing bottom "cup" molds for bottles manufactured via ISBM typically have a slight taper in order to ease decoupling. Because the containers of the present invention are designed to allow units to slide-lock with one another on their side surfaces, the lateral walls cannot taper inward. Decoupling via a relatively long push/pull stroke is considerably more challenging due to the greater potential for dragging and scratching. One way of alleviating these problems is to reduce drag by employing nonstandard or less frequently used mold metals (e.g., stainless steel instead of aluminum) and then carefully controlling molding temperatures, cooling rates and PET characteristics. Another is to reduce drag by treating the mold surface with a special material, compound, or coating that reduces friction. For example, a nickel-ceramic coating might reduce friction to about 25% of an uncoated surface. Other coatings such as nickel-Teflon® may also be employed.

It should be noted that the special coatings may not eliminate all scratch marks. In such cases, it may be beneficial to incorporate subtle vertical striations as design considerations. These subtle vertical striations may provide both further aesthetic distinction and potentially even a more positive connection between units.

The above described technique of forming and decoupling containers with undercuts presents yet another difficulty to surmount. The conjunction of the three mold parts in the above described technique occurs at or very near the shoulder turn line of the given container. Further modification of the groove insertion points and tongue fade-outs is necessary to allow the upper two opposing mold parts to decouple without hanging up on the undercuts in that area, as further discussed below.

Eliminating the de-molding impediments at shoulder line area requires a series of subtle counter-cuts at precise points along that line. Each top corner of each groove 36 and tongue 34 is modified to allow the two directly opposing upper molds to decouple without hanging up on what would otherwise be undercuts. This effect is achieved by locating the vertical parting line between those two upper mold sections at the exact center of two opposing tongues, and above the horizontal mold line, reconfiguring the top portions of the tongue and groove assemblies so that no undercut 62 or 64 impedes retraction of the two directly opposing top mold sections.

It should be noted that, in order to surmount the molding and de-molding challenges for manufacturing the container of the present invention that centrally incorporates undercuts, the choice of currently available blow molding machinery plays an important role and should be carefully considered. The various experiments and calculations leading to the molding/de-molding designs discussed herein led to the selection, at least initially, of linear ISBM machines, rather than rotary machines. In essence, the container designs of the embodiments call for an opposing two-part mold assembly (rather than a hinged to-part clamshell assembly) to form and then detach from the upper section of the vessel (i.e., the section above the shoulder turn). Opposing molds are typically possible with linear ISBM machines.

The several aspects of the technique, as described in the various embodiments, enable manufacturing of complexly shaped containers (i.e., sporting undercuts) in high volumes (tens or even hundreds of millions per year) and in a cost-effective manner.

To produce the exemplary modular interlocking containers, the above set of ISBM variables has been carefully determined. It should be noted that ISBM variables often are unique to a given container design. In certain embodiments, the mold temperature can range from about 8 degrees Centigrade to about 30 degrees Centigrade and is largely dependent on the shape, number, placement, and scale (height, width, depth) of the desired container protrusions. Radial and axial ratios can range from about 1.5 to about 4.5 and are dependent on the distance and configuration of the furthest outlying reaches of the given container. Moreover, in certain embodiments, the temperature of the mold is selected to be in a range of about 20 degrees Centigrade to about 30 degrees Centigrade in order to prevent the expanding material from cooling too quickly. Additionally, for the purposes here, both axial and hoop stretch ratios are selected to be on the lower side of the range in order to allow the material to flow deep into the various bottle protrusions. For example, in certain embodiments, radial and axial ratios are set between about 1.6 and about 3.5.

As will be appreciated by those skilled in the art, a new thermoplastic preform or parison may need to be designed in order to manufacture the modular containers described in the embodiments discussed above. A workable preform or parison results from calculations specific to the container mold. In certain embodiments, areal (axial×hoop) stretch ratio for the preform or parison is about 4.0 to about 12.0, axial stretch ratio is about 1.5 to about 3.4, and hoop stretch ratio is about 2.2 to about 4.5. In certain embodiments described herein, the areal stretch ratio is likely set between about 4.5 and about 6.7, axial stretch ratio is set between about 1.6 and about 1.9, and hoop stretch ratio is likely set between about 2.8 and about 3.5.

As noted previously, one of the challenges with ISBM technique is to coax the molding material into and around tight corners. The task is more difficult when such corners are hard, or "sharp," i.e., non-rounded. The tongue 34 and groove 36 assemblies have several edges where plastic flow might be stopped or impeded in the absence of rounded edges. However, rounding off the "corners" 62, 64 also translates into a shortening of the undercutting facets 62 in the tongue 34 and facets 64 in the grooves 36. Thus, the more specific challenge is to incorporate where appropriate such rounded features in a manner not overly compromising the strength of the related undercuts 62 and 64, particularly given the need already to limit the angle 66 of the undercut for purposes of easier molding and de-molding, as discussed above. It has been determined that to meet the challenges described above, measures of rounding off tongue and groove corners 62, 64 range preferably from about 0.6 mm to about 1.4 mm. In certain embodiments, the measure of rounding employed is between about 0.8 mm and about 0.9 mm. However, these dimensions are exemplary and could be lower or higher and still remain within the scope of the present invention.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. An injection stretch blow mold machine for molding a vessel, the machine comprising:
    a first mold part having at least two lateral engaging portions for engaging a preform of the vessel and configured to extend to a shoulder turn of the vessel;
    a second mold part including a bottom cup mold configured to extend from a shoulder turn of a vessel with sides that form vertical tongue and groove portions, each tongue portion including counter-cuts at top ends of the tongue and groove portions, the sides of the bottom cup mold being perpendicular to a bottom end of the cup mold,
    a blow ring; and
    a push rod, wherein
    i) the two lateral engaging portions of the first mold part are configured to engage the preform;
    ii) the first mold part is positioned vertically above and opposite the second mold part, the first mold part being axially aligned with the second mold part;
    iii) the two lateral engaging portions of the first mold part engage with the second mold part along a vertically aligned path of movement and at a vertical parting line, the engagement occurring below the blow ring, the vertical parting line being positioned at the center of two opposing tongue portions in the bottom cup mold; and
    iv) the push rod is configured to expand the preform towards the cup mold bottom end together with compressed air blown into the preform.

2. The machine of claim 1, wherein:
the vertical parting line is positioned above a horizontal mold line.

3. The machine of claim 1, wherein:
the counter-cuts in the second mold part form counter-cuts in the vessel.

4. The machine of claim 3, wherein:
the first mold part is capable of being decoupled from the vessel by laterally disengaging the two lateral engaging portions over the vessel counter-cuts.

5. A machine for manufacturing a first vessel that can interlock with a second vessel, the machine comprising:
    a first mold part including at least two lateral engaging portions configured to engage a preform and forming an upper neck of the first vessel, the first mold part extending downward from the neck portion to a shoulder turn of the first vessel; and
    a second mold part including a bottom cup mold that extends downward from the shoulder turn of the first vessel and including sides having vertically extending tongue and groove mold portions that form vertically extending tongue and groove portions on the first vessel configured to interlock with similar tongue and groove portions on the second vessel, each tongue portion including a counter-cut at a top end thereof, the sides of the bottom cup mold being perpendicular to a bottom end of the cup mold.

6. The machine of claim 5, further comprising:
a blow ring, wherein the two lateral engaging portions of the first and second mold parts separate along a vertically aligned path of movement and at a vertical parting line, and the engagement of the two lateral engaging portions occurs below the blow ring.

7. The machine of claim 5, wherein the vertical parting line is positioned at the center of two opposing tongue portions in the bottom cup mold; and further comprising a push rod configured to expand the preform into the first and second mold parts.

8. The machine of claim 5, wherein the vertical parting line is positioned above a horizontal mold line separating the first and second mold parts.

* * * * *